(12) United States Patent
Brauer (10) Patent No.: US 7,206,948 B2
(45) Date of Patent: Apr. 17, 2007

(54) SYSTEM AND METHOD FOR REDUCING POWER USAGE

(75) Inventor: James B. Brauer, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 434 days.

(21) Appl. No.: 10/731,283

(22) Filed: Dec. 9, 2003

(65) Prior Publication Data

US 2005/0125704 A1    Jun. 9, 2005

(51) Int. Cl.
*G06F 1/00*    (2006.01)
*G06F 1/32*    (2006.01)

(52) U.S. Cl. ........................... 713/320; 713/300
(58) Field of Classification Search ............... 713/320, 713/300
See application file for complete search history.

(56) References Cited

U.S. PATENT DOCUMENTS

| | | | |
|---|---|---|---|
| 5,457,365 A | 10/1995 | Blagaila | |
| 5,473,238 A | 12/1995 | Latham | |
| 5,481,733 A * | 1/1996 | Douglis et al. | 713/324 |
| 5,517,649 A * | 5/1996 | McLean | 713/323 |
| 5,521,896 A | 5/1996 | Bajorek | |
| 5,544,138 A | 8/1996 | Bajorek | |
| 5,574,920 A | 11/1996 | Parry | |
| 5,682,273 A | 10/1997 | Hetzler | |
| 5,774,292 A | 6/1998 | Georgiou | |
| 5,819,100 A * | 10/1998 | Pearce | 713/323 |
| 5,898,880 A | 4/1999 | Ryu | |
| 5,964,878 A | 10/1999 | Ryu | |
| 6,134,069 A | 10/2000 | Catalano | |

* cited by examiner

*Primary Examiner*—Thomas Lee
*Assistant Examiner*—Ji H. Bae
(74) *Attorney, Agent, or Firm*—David K. Lucente; Derek J. Berger (57) ABSTRACT

According to one embodiment of the present invention, a method of reducing power use in a device capable of operating at two or more power levels includes selecting a range of power management timer settings for a first power management timer. The first power management timer is for switching the device from a first power level to a second power level. In the second power level portions of the device are de-energized. An estimated energy value to complete a series of tasks is calculated for each of a plurality of settings within the range of power management timer settings. A power management timer setting is selected from the range of power management timer settings based on the estimated energy value to complete a series of tasks for each of the plurality of settings within the range of settings.

27 Claims, 9 Drawing Sheets

SYSTEM AND METHOD FOR REDUCING POWER USAGE

FIELD OF THE INVENTION

This application relates generally to power management in electrical and electronic devices and more particularly to reducing power usage of a device capable of operating at multiple power consumption levels.

BACKGROUND OF THE INVENTION

Power management is a significant concern especially for notebook computers and other portable electrical and electronic devices that operate on battery power. In order to reduce power consumption, many devices are operated at two or more power levels. For example, one level, or mode, may be a typical operating mode in which all components of the device are energized and ready to operate. A second mode may be a reduced power mode in which portions of the device are de-energized. For example, in a data storage device such as a disc drive, one reduced power mode may de-energize the read/write channel chip, read/write heads, and a differential preamplifier. In some cases, additional modes may further de-energize the various other components of the data storage device. Similarly, other types of devices may selectively de-energize portions various components to reduce power consumption. Various examples include a notebook computer that hibernates after a period of inactivity, a copier or fax machine entering a sleep mode after a period of inactivity, a handheld device or cell phone that shuts off the display light after a period of time, etc.

Firmware code stored in memory, either external or internal to the microprocessor of the device, and executed by the microprocessor controls the operation of the various modes. Typically, the code relies on one or more power management timers for determining entry into a reduced power mode. That is, after a specified timer period has passed without activity, such as receiving a request from a host in the data storage device example, the device is placed into a reduced power mode.

However, operating a device in a reduced power mode is not without costs. Changing to a lower power mode has two consequences. First, extra energy may be used to transition into and out of a given mode. Additionally, extra time is taken to complete tasks required of the device when it is operating in lower power modes since the device must re-energize before performing the task.

Typically, selection of power management timer values does not take these costs into consideration. Usually, timer values are arbitrarily selected. In some cases timer values are arbitrarily short in an attempt to reduce energy use. In other cases, timer values are arbitrarily long in an attempt to improve performance. As a result, neither power management concerns nor throughput concerns may be adequately addressed or balanced against each other.

Accordingly there is a need for systems and methods for selecting power management timer values based on the overall effect that a timer value or combination of timer values may have on a device. The present invention provides a solution to this and other problems, and offers other advantages over the prior art.

SUMMARY OF THE INVENTION

Against this backdrop the present invention has been developed. According to one embodiment of the present invention, a method of reducing power use in a device capable of operating at two or more power levels includes selecting a range of power management timer settings for a first power management timer. The first power management timer is for switching the device from a first power level to a second power level. In the second power level portions of the device are de-energized. An estimated energy value to complete a series of tasks is calculated for each of a plurality of settings within the range of power management timer settings. A power management timer setting is selected from the range of power management timer settings based on the estimated energy value to complete a series of tasks for each of the plurality of settings within the range of settings.

According to another embodiment of the present invention, a system to reduce power use in a device capable of operating at two or more power levels includes a processor and a memory coupled with and readable by the processor. The memory has stored therein a series of instructions that, when executed by the processor, cause the processor to select a range of power management timer settings for a first power management timer. The first power management timer is for switching the device from a first power level to a second power level wherein portions of the device are de-energized. An estimated energy value to complete a series of tasks is calculated for each of a plurality of settings within the range of power management timer settings. A power management timer setting is selected from the range of power management timer settings based on the estimated energy value to complete a series of tasks for each of the plurality of settings within the range of settings.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or a compact disc drive, that is capable of operating in two or more power levels. Further, one skilled in the art will understand that embodiments of the present invention are equally applicable to any type of electrical or electronic device capable of operating at more than one power level. For example, devices that may implement embodiments of the present invention include but are not limited to notebook computers, handheld devices such as Personal Digital Assistants (PDAs), cell phones, office equipment such as copiers and fax machines, etc.

Figure 1:
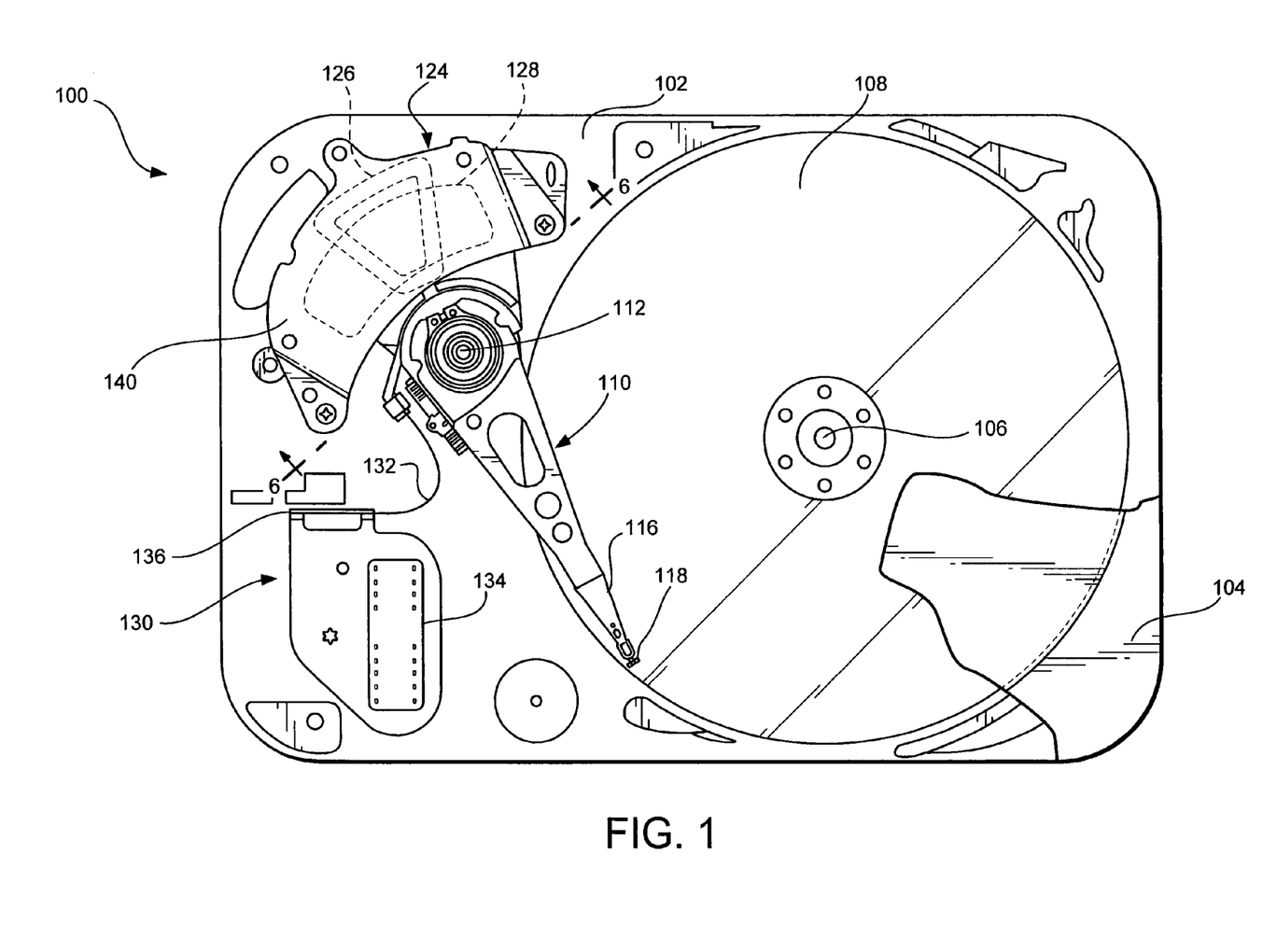
FIG. 1 is a plan view of a disc drive in accordance with an embodiment of the present invention illustrating the primary internal components of the disc drive.

FIG. 1 is a plan view illustrating the primary internal components of a disc drive incorporating one of the various embodiments of the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disk 108 containing data when the drive motor is de-energized. The heads 118 are secured over portions of the disk not containing data through the use of an actuator latch arrangement and/or ramp, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly 130 includes a printed circuit board 134 to which a flex cable 132 connected with the actuator assembly 100 and leading to the head 118 is connected. The flex cable 132 may be routed along the actuator arms 114 and the flexures 116 to the heads 118. The printed circuit board 134 typically includes circuitry for controlling the write currents applied to the heads 118 during a write operation and a preamplifier for amplifying read signals generated by the heads 118 during a read operation. The flex assembly 132 terminates at a flex bracket 136 for communication through the base deck 102 to a disc drive printed circuit board (not shown) mounted to the bottom side of the disc drive 100.

Figure 2:
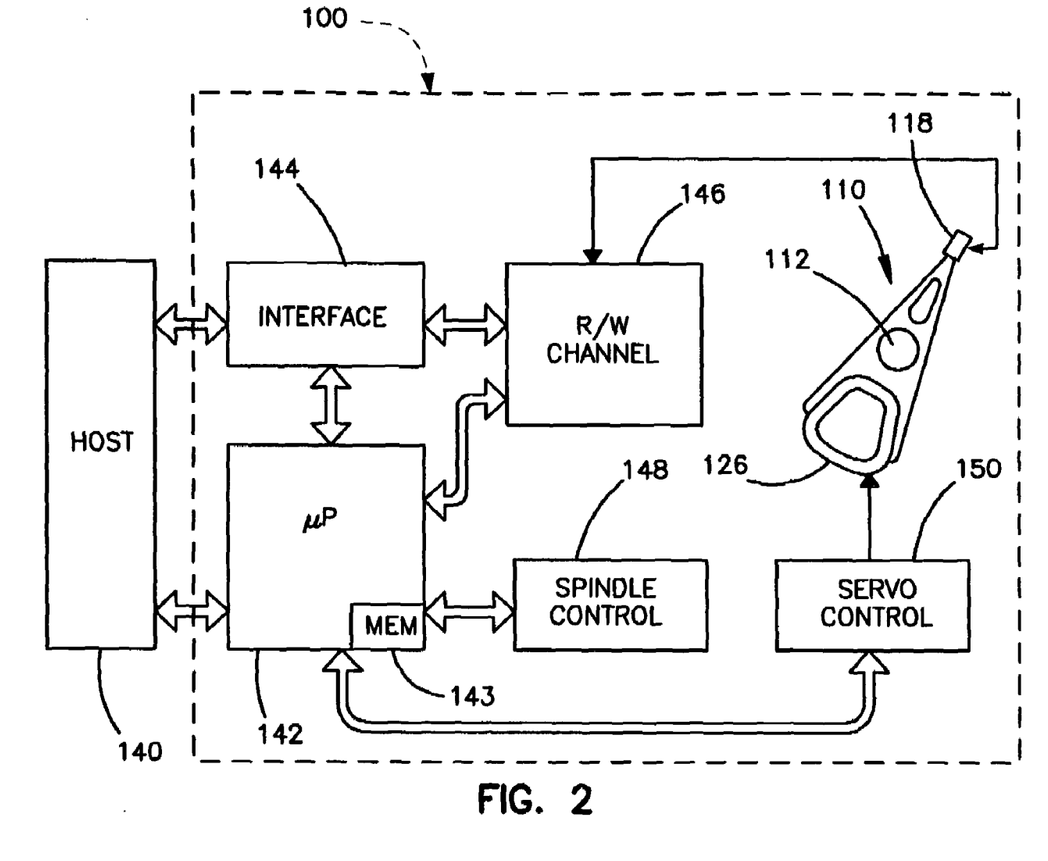
FIG. 2 is a control block diagram for the disc drive shown in FIG. 1 illustrating the primary functional components.

FIG. 2 is a control block diagram for the disc drive 100 illustrating the primary functional components of the disc drive 100 incorporating one of the various embodiments of the present invention and generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use, typically, of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the data storage device 100, read signals are generated by the heads 118 and provided to the read/write channel 146, which performs decoding and error detection and correction operations and outputs the retrieved data to the interface 144 for subsequent transfer to the host computer 140 or other device.

Memory 143 may include a routine for reducing power consumption by the data storage device 100 by entering one or more reduced power levels in which portions of the data storage device may be de-energized. Similarly, any other type of device capable of operating at two or more power levels may have a routine for reducing power consumption stored in memory within the device that is readable and executable by a processor for controlling the device. Power management timers maintained by the microprocessor 142 are used to control transition into the reduced power levels based on an elapsed time since a command was received by the data storage device from a host to which it is connected.

As will be described below, selection of these power management timer values may be based on an energy model calculated for a range of possible power management timer settings. Power management timer values may then be selected, based on the energy model that lower the energy used for a given set of delays between commands or tasks. Additionally, the timer values may be selected based on their effect on throughput which may similarly be modeled.

Figure 3:
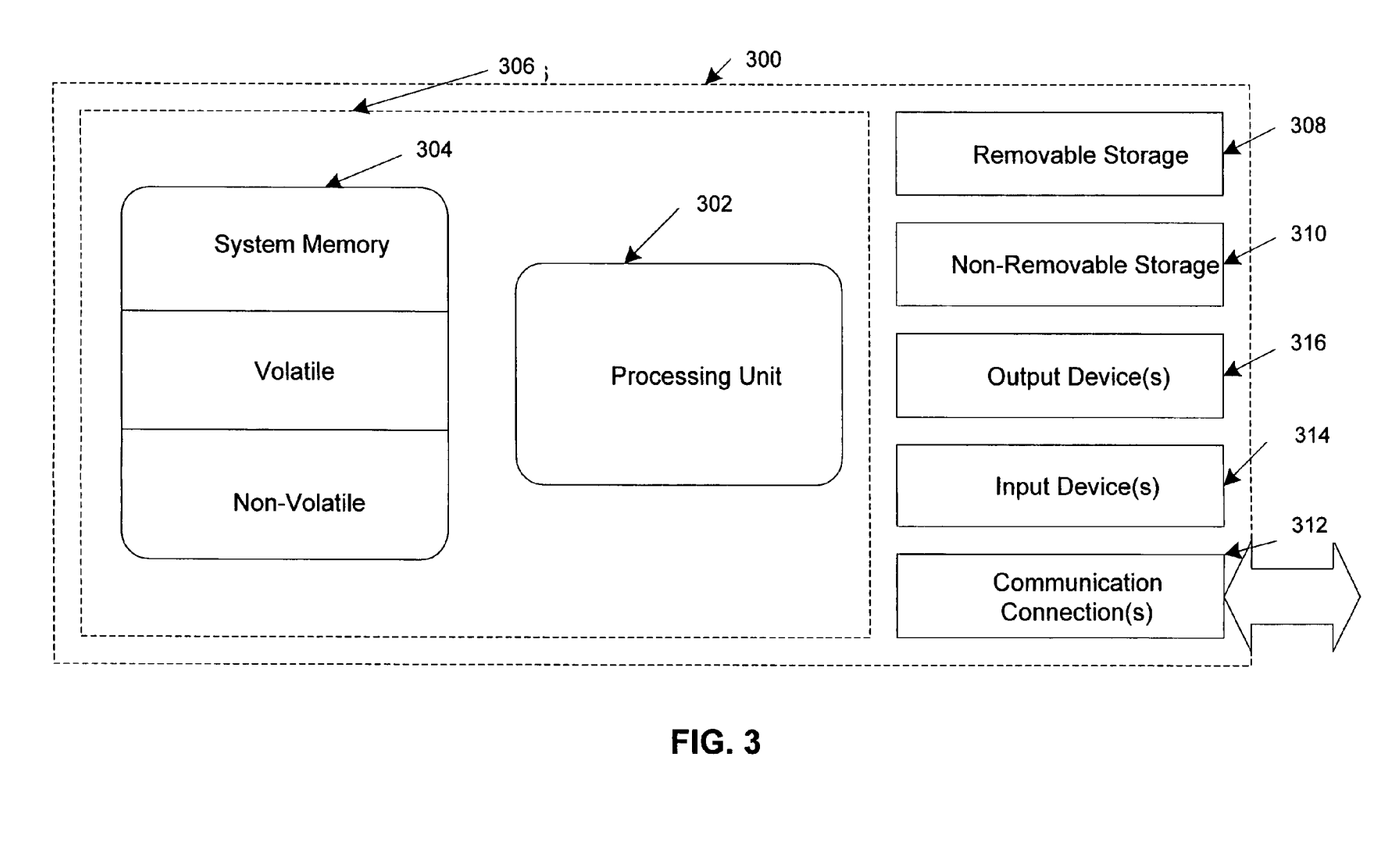
FIG. 3 illustrates an example of a suitable computing system environment on which embodiments of the invention may be implemented.

FIG. 3 illustrates an example of a suitable computing system environment on which embodiments of the invention may be implemented. The system 300 illustrated here is an example of one that may be used during the early stages of device development to select power management timer values. As will be described below, the system 300 may be used to model total energy use and/or throughput delay incurred by processing a series of tasks such as host issued commands or user initiated commands or tasks for a range of power management timer settings.

In its most basic configuration, system 300 typically includes at least one processing unit 302 and memory 304. Depending on the exact configuration and type of computing device, memory 304 may be volatile (such as RAM), non-volatile (such as ROM, flash memory, etc.) or some combination of the two. This most basic configuration is illustrated in FIG. 3 by dashed line 306. Additionally, system 300 may also have additional features/functionality. For example, system 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and can be accessed by system 300. Any such computer storage media may be part of system 300.

System 300 may also contain communications connection(s) 312 that allow the system to communicate with other devices. Communications connection(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 300 may also have input device(s) 314 such as keyboard, mouse, pen, voice input device, touch input device, etc. Output device(s) 316 such as a display, speakers, printer, etc. may also be included. All these devices are well know in the art and need not be discussed at length here.

A computing device, such as system 300, typically includes at least some form of computer-readable media. Computer readable media can be any available media that can be accessed by the system 300. By way of example, and not limitation, computer-readable media might comprise computer storage media and communication media.

Figure 4:
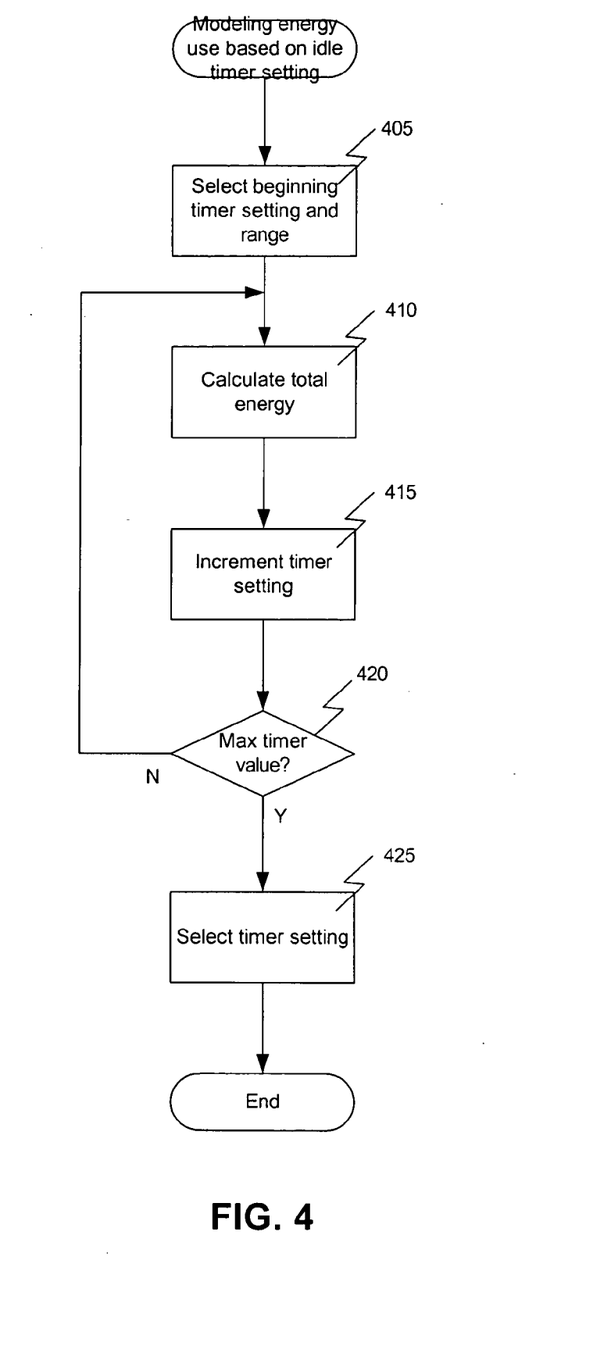
FIG. 4 is a flowchart illustrating modeling energy use based on power management timer setting according to one embodiment of the present invention.

FIG. 4 is a flow chart illustrating modeling energy use based on power management timer settings according to one embodiment of the present invention. In this example, two power levels are assumed such as a standard operating level and an idle level in which portions of the device are de-energized. In such a case, there are three possible power states to consider, the first power level, the transition from the first power level to the second power level, and the second power level.

In FIG. 4 operation begins with set operation 405. Set operation 405 comprises selecting a beginning power management timer setting and a range of power management timer settings for which the model will be developed. Control then passes to calculate operation 410.

As will be described in detail below, calculate operation 410 comprises calculating the total energy utilized for a specific power management timer setting. Generally speaking, total energy includes energy used to handle a command or task that may occur during each of the power levels as well as the transition between levels.

Once the total energy for a specific timer setting is calculated at calculation operation 410, control passes to increment operation 415. Increment operation 415 comprises incrementing the power management timer setting by a predetermined amount to the next setting to be modeled.

Next, at query operation 420, a determination is made as to whether the power management timer setting has exceeded a maximum value. That is, the power management timer setting is checked against the maximum end of the range of power management timer settings to be modeled. If, at query operation 420, the power management timer setting has not exceeded the maximum end of the range to be modeled, control returns to calculate operation 410 where an estimated energy value to complete a series of commands or tasks will be calculated for the next power management timer value. In other words an estimated energy value to complete a series of tasks is calculated for each of a plurality of settings within the range of power management timer settings.

If, at query operation 420, the power management timer setting has exceeded the maximum end of the range of power management timer settings to be modeled, control passes to select operation 425. Select operation 425 comprises selecting a power management timer setting from the range of power management timer settings modeled. This selection may be based on the lowest total energy calculated. That is, the total energy results may be searched for the lowest total energy result and the corresponding power management timer setting may be selected. Alternatively, the selection may include other considerations such as the power management timer setting effect on throughput delay incurred by processing a series of tasks as will be discussed below with reference to FIGS. 8 and 9.

Figure 5:
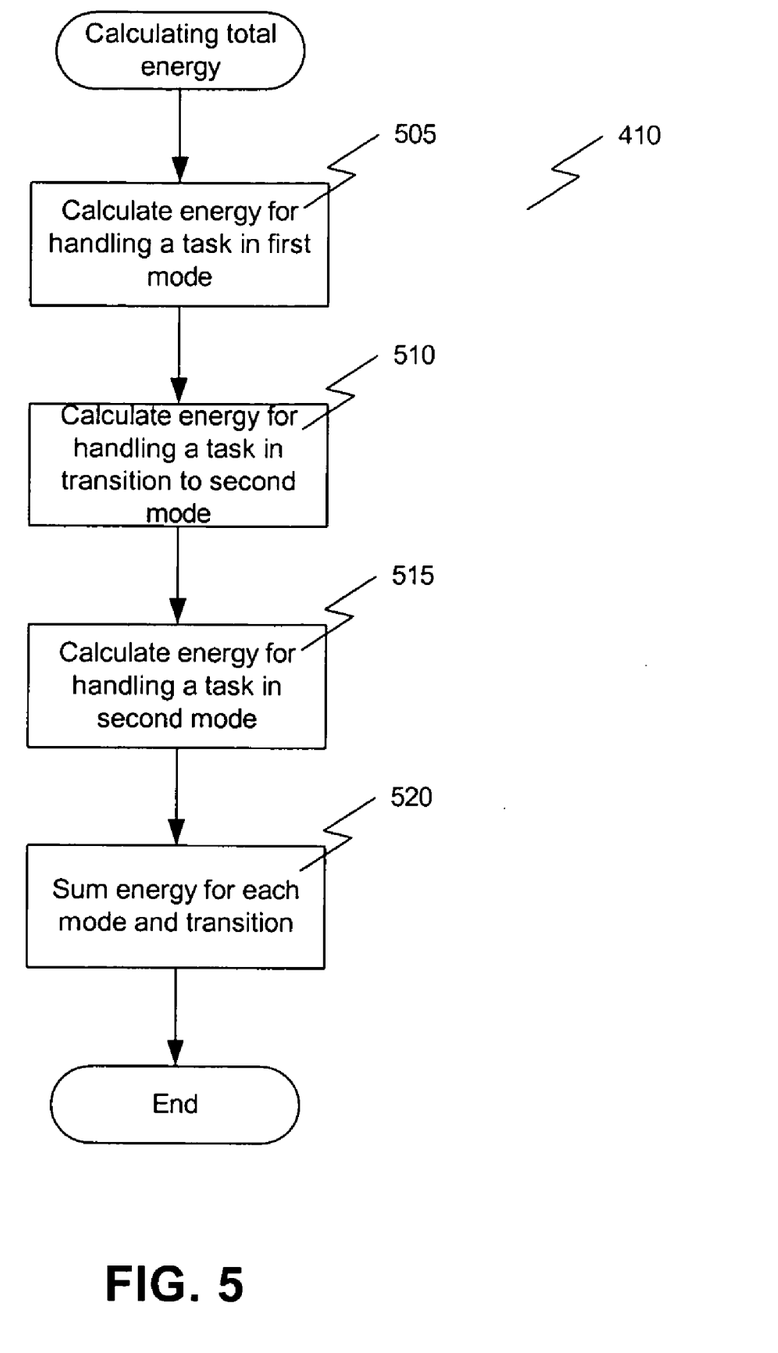
FIG. 5 is a flowchart illustrating calculation of total energy use for one power management timer setting according to the embodiment illustrated in FIG. 4.

FIG. 5 is a flow chart illustrating calculation of total energy use for one power management timer setting according to the embodiment illustrated in FIG. 4. Here, operation begins with calculate operation 505. Calculate operation 505 comprises calculating the total energy for handling a command or task that arrives when the device is in a first power level such as a normal operating mode. Energy is defined herein as power multiplied by time. Total energy is the energy used prior to receiving a command or task plus the energy to complete the command or task in the current power level. The energy used prior to receiving the command or task varies with the delay. Energy to handle a command or task received while the device is in any given power level remains relatively static and may be determined through testing during device development. Therefore, calculation of total energy for handling a task that arrives when the device is in a first power level may be expressed as:

$$E_{first\ power\ level} = (t1-t2)*P1+E2$$

where:
t1=power management timer setting
t2=time to handle the task
P1=average power used in first power level
E2=measured energy to handle a task in first power level Next, control passes to calculate operation 510. Calculate operation 510 comprises calculating the energy used for handling a task received when the device is in transition from the first power level to the second power level. Total energy to handle such a task is the measured energy for handling a task during the transition plus the energy used during the time in the first power level. Therefore, this calculation may be expressed as:

$$E_{second\ power\ level\ transition} = (t1-t3)*P1+E4$$

where:
t1=power management timer setting
t3=time to transition into second power level+time to handle the task
P1=average power used in first power level
E4=measured energy to handle a task occurring during transition Control then passes to calculate operation 515. Calculate operation 515 comprises calculating the total energy for handling a task that arrives while the device is in the second power level. Total energy to handle such a task includes energy used during the time in the first, power level, the energy used during the time in the second power level, and measured energy to handle a task in the second power level. Therefore, this calculation may be expressed as:

$$E_{second\ power\ level} = P1*(t4+t3)+P2*(t1-t3-t4)+E6$$

where:
P1=average power in first power level
t1=power management timer setting
t3=time to transition into the second power level
t4=second power level timer
t5=time to handle a task in the second power level
P2=average power in second power level
E6=measured energy to handle a task in the second power level Finally, control passes to summation operation 520. Summation operation 520 comprises adding all of the calculated energies for handling tasks that may occur in the various modes. Therefore, this operation may be expressed as:

$$E_{first\ power\ level} + E_{second\ power\ level\ transition} + E_{second\ power\ level}$$

While FIGS. 4 and 5 illustrate an example applicable to a device having two modes of operation, it should be understood that these examples can be expanded to apply to devices having more than two modes. For example, FIGS. 4 and 5 may easily be expanded to include a device having three modes of operation and two power management timers.

Figure 6:
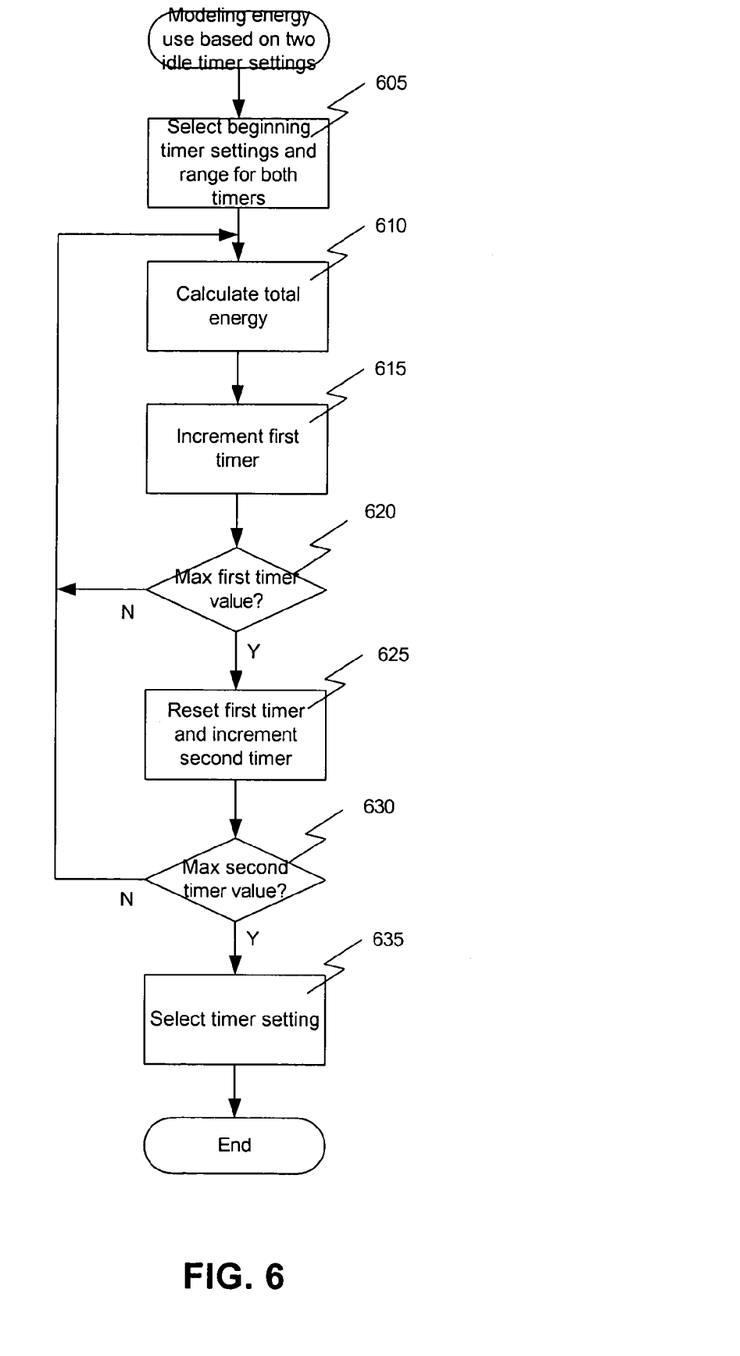
FIG. 6 is a flowchart illustrating modeling energy use based on two power management timer settings according to another embodiment of the present invention.

FIG. 6 is a flow chart illustrating modeling energy use based on two power management timer settings according to another embodiment of the present invention. In this example, three power levels are assumed such as a standard operating mode, a power management mode in which some portions of the device are de-energized, and a second power management mode in which additional portions of the device are de-energized. In such a case, there are five possible power states to consider, first power level, transition from first power level to second power level, second power level, transition from second power level to third power level, and third power level.

In FIG. 6 operation begins with set operation 605. Set operation 605 comprises selecting beginning timer settings for both power management timers and a range of timer settings for which the model will be developed. Control then passes to calculate operation 610.

As will be described in detail below, calculate operation 610 comprises calculating the total energy utilized to complete a series of tasks for a specific combination of timer settings. Generally speaking, total energy includes energy used to handle tasks that may occur during each of the power levels as well as the transition between levels.

Once the total energy to complete a series of tasks for a specific combination of timer settings is calculated at calculation operation 610, control passes to increment operation 615. Increment operation 615 comprises incrementing the first power management timer setting by a predetermined amount to the next setting to be modeled.

Next, at query operation 620, a determination is made as to whether the first power management timer value has exceeded a maximum setting. That is, the first power management timer setting is checked against the maximum end of the range of timer settings to be modeled. If, at query operation 620, the first power management timer setting has not exceeded the maximum end of the range to be modeled, control returns to calculate operation 610 where an estimated energy value to complete a series of tasks will be calculated for the next power management timer setting. In other words an estimated energy value to complete a series of tasks is calculated for each of a plurality of settings within the range of settings for the first power management timer.

If, at query operation 620, the first power management timer setting has exceeded the maximum end of the range of power management timer settings to be modeled, control passes to reset operation 625. Reset operation 625 comprises resetting the first power management timer and incrementing the second power management timer setting.

Next, at query operation 630, a determination is made as to whether the second power management timer setting has exceeded a maximum setting. That is, the second power management timer setting is checked against the maximum end of the range of timer settings to be modeled. If, at query operation 630, the second power management timer setting has not exceeded the maximum end of the range to be modeled, control returns to calculate operation 610 where an estimated energy value to complete a series of tasks will be calculated for the next power management timer setting. In other words an estimated energy value to complete a series of tasks is calculated for each of a plurality of settings within the range of settings for the second power management timer.

If, at query operation 630, the second power management timer has exceeded the maximum end of the range of timers to be modeled, control passes to select operation 635.

Select operation 635 comprises selecting a first power management timer setting and a second power management timer setting from the range of power management timer settings modeled. This selection may be based on the lowest total energy calculated. That is, the total energy results may be searched for the lowest total energy result and the corresponding power management timer setting may be selected. Alternatively, the selection may include other considerations such as the power management timer setting effect on throughput delay incurred by processing a series of tasks as will be discussed below with reference to FIGS. 8 and 9.

Figure 7:
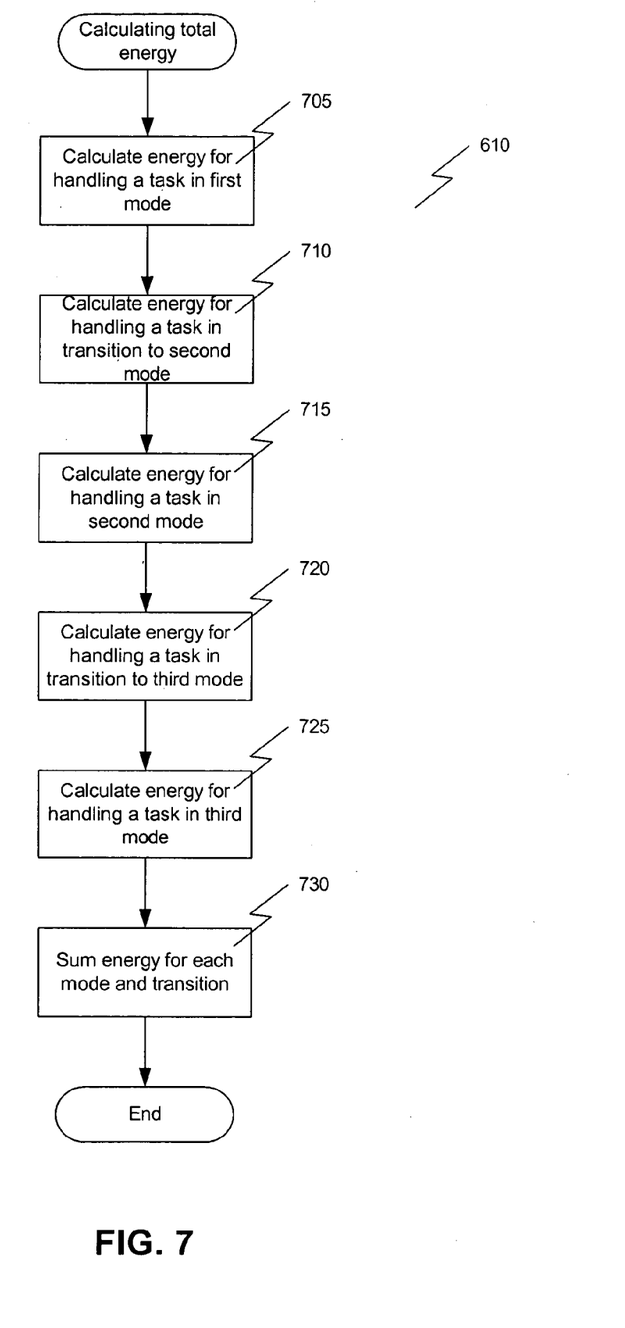
FIG. 7 is a flowchart illustrating calculation of total energy for two power management timer settings according to the embodiment illustrated in FIG. 6.

FIG. 7 is a flowchart illustrating calculation of total energy for two power management timer settings according to the embodiment illustrated in FIG. 6. Here, operation begins with calculate operation 705. Calculate operation 705 comprises calculating the total energy for handling a task that arrives when the device is in a first power level such as a normal operating mode. As explained above, this calculation may be expressed as:

$$E_{first\ power\ level} = (t1-t2)*P1+E2$$

where:
- t1=first power management timer setting
- t2=time to handle the task
- P1=average power used in first power level
- E2=measured energy to handle a task in first power level Next, control passes to calculate operation 710. Calculate operation 710 comprises calculating the energy used for handling a task received when the device is in transition from the first power level to the second power level. As explained above, this calculation may be expressed as:

$$E_{second\ power\ level\ transition} = (t1-t3)*P1+E4$$

where:
- t1=first power management timer setting
- t3=time to transition into second power level+time to handle the task
- P1=average power used in first power level
- E4=measured energy to handle a task occurring during transition Control then passes to calculate operation 715. Calculate operation 715 comprises calculating the total energy for handling a task that arrives while the device is in a second power level. Also as explained above, this calculation may be expressed as:

$$E_{second\ power\ level} = P1*(t4+t3)+P2*(t1-t3-t4)+E6$$

where:
- P1=average power in first power level
- t1=first power management timer setting
- t3=time to transition into the second power level
- t4=second power level timer
- t5=time to handle a task in the second power level
- P2=average power in second power level
- E6=measured energy to handle a task in the second power level Next, control passes to calculate operation 720. Calculate operation 720 comprises calculating the energy used for handling a task received when the device is in transition from the second power level to the third power level. This calculation may be expressed as:

$$E_{third\ power\ level\ transition} = P1*t4+P2*t6+E7$$

where:
- P1=average power in first power level
- P2=average power in second power level
- t4=second power management timer setting
- t6=third power level timer E7=measured energy to handle a task received during transition from second power level to third power level Control then passes to calculate operation 725. Calculate operation 725 comprises calculating the energy used for handling a task that may occur while the device is in the third power level. This calculation may be expressed as:

$$E_{third\ power\ level} = P1*t4+P2*t6+P3*(t1-t4-t6-t7-t8)+E9+Ea$$

where:
- t1=first power management timer setting
- t4=second power management timer setting+transition time
- t6=third power level timer
- t7=third power level transition time
- t8=third power level task time
- P1=average power in first power level
- P2=average power in second power level
- P3=average power in third power level
- E9=measured energy to handle a task in third power level
- Ea=measured energy for the third power level transition Finally, control passes to summation operation 730. Summation operation 730 comprises adding all of the calculated energies for handling tasks that may occur in the various modes. Therefore, this operation may be expressed as:

$$E_{first\ power\ level} + E_{second\ power\ level\ transition} + E_{second\ power\ level} + E_{third\ power\ level\ transition} + E_{third\ power\ level}$$

As indicated above, selection of the power management timer settings may be based on the total energy model and possibly other considerations. For example, throughput delays incurred by processing a series of tasks by the device for a given power management timer setting or combination of settings may be modeled in a manner similar to total energy. This throughput model may be used as a consideration in selecting timer settings.

Figure 8:
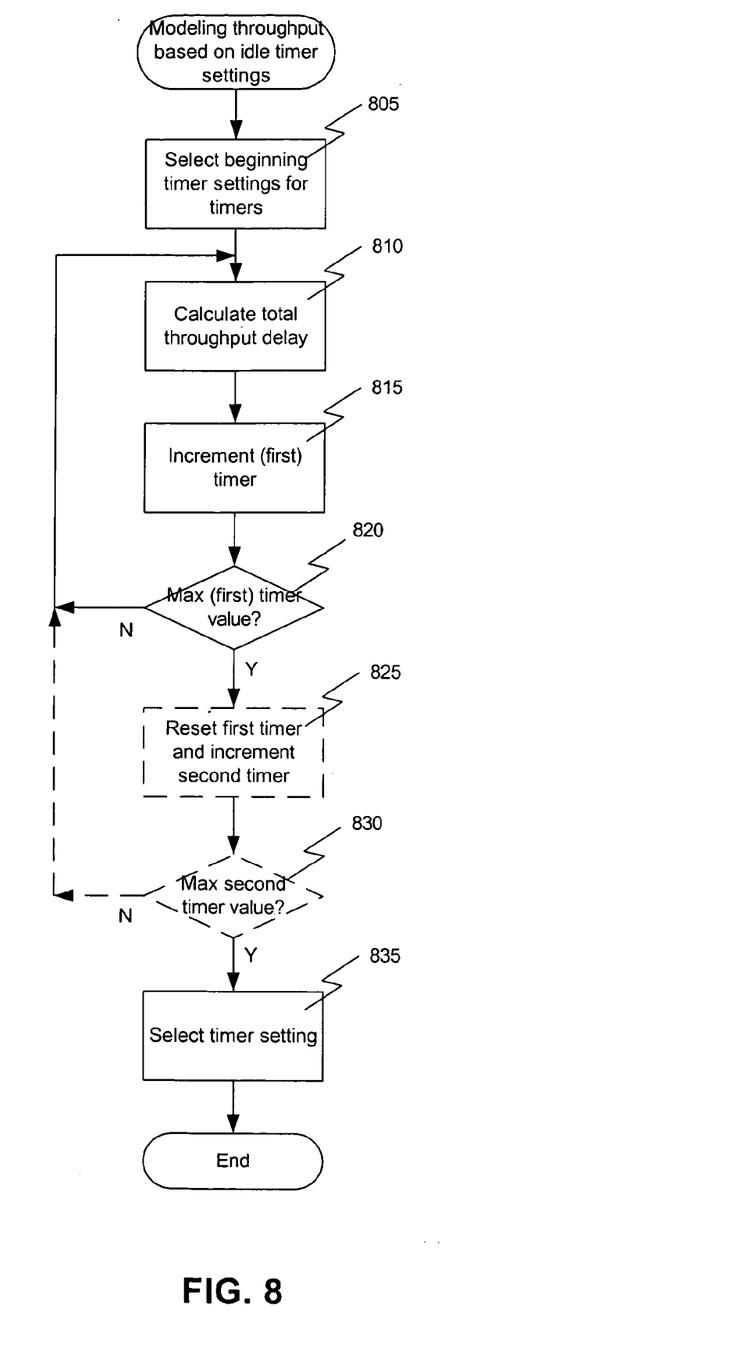
FIG. 8 is a flowchart illustrating modeling throughput delay incurred by processing a series of tasks for a range of power management timer values according to yet another embodiment of the present invention.

FIG. 8 is a flowchart illustrating determining throughput delay incurred by processing a series of tasks for a range of power management timer values according to yet another embodiment of the present invention. In this example, three power levels are assumed such as a standard operating mode, a power management mode in which some portions of the device are de-energized, and a second power management mode in which additional portions of the device are de-energized. As discussed above with regards to the total energy model, this process may also be easily modified to model throughput delay incurred by processing a series of tasks for a device having a different number of power levels.

In the case of a device having three power levels, there are five possible power states to consider: first power level; transition from first power level to second power level; second power level; transition from second power level to third power level; and third power level.

In FIG. 8 operation begins with set operation 805. Set operation 805 comprises selecting beginning timer settings for both power management timers and a range of timer settings for which the model will be developed. Alternatively, if more or fewer power levels are available, the range of timer values for each level will be selected.

Control then passes to calculate operation 810. As will be described in detail below, calculate operation 810 comprises calculating the throughput delay incurred by processing a series of tasks for a specific combination of timer settings. Generally speaking, throughput delay includes time needed to handle a task that may occur during each of the power levels as well as the time needed to transition between levels. The delay is calculated as the time to handle the task in the current mode minus the time to handle a task in normal operating mode.

Once the throughput delay incurred by processing a series of tasks for a specific combination of timer settings is calculated at calculation operation 810, control passes to increment operation 815. Increment operation 815 comprises incrementing the first power management timer setting by a predetermined amount to the next value to be modeled.

Next, at query operation 820, a determination is made as to whether the first power management timer setting has exceeded a maximum setting. That is, the first power management timer setting is checked against the maximum end of the range of timer settings to be modeled. If, at query operation 820, the first power management timer setting has not exceeded the maximum end of the range to be modeled, control returns to calculate operation 810 where a throughput delay incurred by processing a series of tasks will be calculated for the next power management timer setting. In other words a total throughput delay incurred by processing a series of tasks value is calculated for each of a plurality of settings within the range of first power management timer settings.

If, at query operation 820, the first power management timer setting has exceeded the maximum end of the range of power management timer settings to be modeled, control passes to reset operation 825. Reset operation 825 may be considered option here because it may not be performed when modeling a device having only two power levels. If performed, reset operation 825 comprises resetting the first power management timer setting and incrementing the second power management timer setting.

Next, at query operation 830, a determination is made as to whether the second power management timer setting has exceeded a maximum value. That is, the second power management timer setting is checked against the maximum end of the range of timer settings to be modeled. Similar to reset operation 825, query operation 830 may be considered optional because it may not be performed when modeling a device having only two power levels. If, at query operation 830, the second power management timer setting has not exceeded the maximum end of the range to be modeled, control returns to calculate operation 810 where an estimated energy value to complete a series of tasks will be calculated for the next power management timer setting. In other words a total throughput delay incurred by processing a series of tasks value is calculated for each of a plurality of settings within the range of second power management timer settings.

If, at query operation 830, the second power management timer has exceeded the maximum end of the range of timers to be modeled, control passes to select operation 835.

Select operation 835 comprises selecting a power management timer setting from the range of power management timer settings modeled. This selection may be based on the lowest throughput delay incurred by processing a series of tasks calculated. That is, the throughput delay incurred by processing a series of tasks results may be searched for the lowest throughput delay result and the corresponding power management timer settings may be selected. Alternatively, the selection may include other considerations such as the power management timer setting effect on total energy as discussed above. In some cases, throughput and total energy use may be balanced against each other. For example, a total energy range may be selected and power management timer settings within that range may be selected based on throughput. Conversely, a throughput range may be selected and power management timer settings within that range may be selected based on total energy use.

Figure 9:
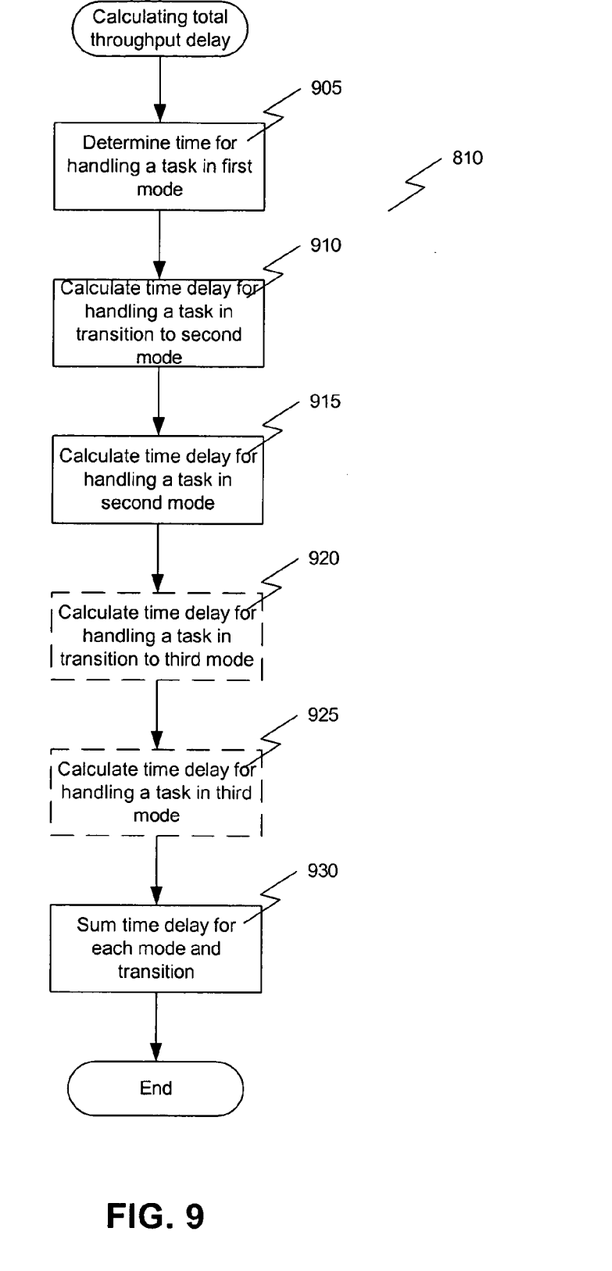
FIG. 9 is a flowchart illustrating calculation of total throughput delay incurred by processing a series of tasks for power management timer settings according to the embodiment illustrated in FIG. 8.

FIG. 9 is a flowchart illustrating calculation of total throughput delay incurred by processing a series of tasks for power management timer settings according to the embodiment illustrated in FIG. 8. Here, operation begins with calculate operation 905. Calculate operation 905 comprises calculating the throughput for handling a task that arrives when the device is in a first power level such as a normal operating mode. Throughput in the first power level is simply the time required to handle a task in normal operating mode and may be determined through testing during device development. Since the first power level is a base line, no delay calculation is required other than determining the baseline time. This time will be represented as t1.

Next, control passes to calculate operation 910. Calculate operation 910 comprises calculating the delay for handling a task received when the device is in transition from the first power level to the second power level. The delay to handle such a task is the measured time required to handle a task in transition to the second power level minus the time to handle a task in the first power level. Therefore, this calculation may be expressed as:

$$t_{delay1} = t2 - t1$$

where:
t1=time to handle a task in the first power level
t2=measured time to handle a task in transition to second power level Control then passes to calculate operation 915. Calculate operation 915 comprises calculating the delay for handling a task that arrives while the device is in a second mode. Delay to handle such a task is the time required to handle a task in normal operating mode subtracted from the time required to handle a task in the second power level. Therefore, this calculation may be expressed as:

$$t_{delay2} = t3 - t1$$

where:
t1=time to handle a task in the first power level
t3=measured time to handle a task in second power level Next, control passes to calculate operation 920. Calculate operation 920 may be considered optional here since it may not be performed for a device having only two modes of operation. However, if performed, calculate operation 920 comprises calculating the delay for handling a task received when the device is in transition from the second mode to the third mode. This calculation may be expressed as:

$$t_{delay3} = t4 - t1$$

where:
t1=time to handle a task in the first power level
t4=measured time to handle a task in transition to third power level Control then passes to calculate operation 925. Calculate operation 925 may also be considered optional here since it may not be performed for a device having only two modes of operation. However, if performed, calculate operation 925 comprises calculating the energy used for handling a task that may occur while the device is in the third mode. This calculation may be expressed as:

$$t_{delay4} = t5 - t1$$

where:

t1=time to handle a task in the first power level
t5=measured time to handle a task in third power level Finally, control passes to summation operation 930. Summation operation 930 comprises adding all of the calculated delays for handling tasks that may occur in the various modes. Therefore, this operation may be expressed as:

$$\text{Total delay} = t_{delay1} + t_{delay2} + t_{delay3} + t_{delay4}$$

As indicated above, the throughput model generated by calculating throughput delay incurred by processing a series of tasks for a range of power management timer settings or a combination of ranges for multiple power management timer settings may be a basis for selecting the power management timer settings. In some cases, the throughput model may be considered in combination with the total energy model. In other cases, either total energy or throughput may be used individually.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the number of power levels, and therefore the number of power management timers, for a given device may vary. Additionally, selection of power management timer settings may be based on a number of criteria including but not limited to total energy use and total throughput delay incurred by processing a series of tasks. Numerous other changes may be made which will readily suggest themselves to those skilled in the art and which are encompassed in the spirit of the invention disclosed and as defined in the appended claims.

What is claimed is:

1. A method comprising:
    selecting a range of power management timer settings for a first power management timer, the first power management timer for switching a device from a first power level to a second power level wherein portions of the device are de-energized;
    calculating an estimated energy value to complete a series of tasks for each of a plurality of settings within the range of power management timer settings; and
    selecting a power management timer setting from the range of power management timer settings based on the estimated energy value to complete the series of tasks for each of the plurality of settings within the range of settings.

2. The method of claim 1, wherein calculating an estimated energy value to complete a series of tasks for each of a plurality of settings within the range of power management timer settings comprises:
    calculating a first energy value representing energy used by the device to handle tasks received when the device is in the first power level;
    calculating a second energy value representing energy used by the device to handle tasks received when the device is in a transition from the first power level to the second power level;
    calculating a third energy value representing energy used by the device to handle tasks received when the device is in the second power level; and
    adding the first energy value, second energy value, and third energy value.

3. The method of claim 1, wherein selecting a range of power management timer settings further comprises selecting a range of power management timer settings for a second power management timer, the second power management timer for switching the device from the second power level to a third power level wherein additional portions of the device are de-energized.

4. The method of claim 3, wherein calculating an estimated energy value to complete a series of tasks for each of a plurality of settings within the range of power management timer settings comprises:
    calculating a first energy value representing energy used by the device to handle tasks received when the device is in the first power level;
    calculating a second energy value representing energy used by the device to handle tasks received when the device is in a transition from the first power level to the second power level;
    calculating a third energy value representing energy used by the device to handle tasks received when the device is in the second power level;
    calculating a fourth energy value representing energy used by the device to handle tasks received when the device is in a transition from the second power level to the third power level;
    calculating a fifth energy value representing energy used by the device to handle tasks received when the device is in the third power level; and
    adding the first energy value, second energy value, third energy value, fourth energy value, and fifth energy value.

5. The method of claim 3, wherein selecting the power management timer setting from the range of power management timer settings comprises selecting a first power management timer setting and selecting a second power management timer setting.

6. The method of claim 1, further comprising modeling throughput for the device based on the range of power management timer settings.

7. The method of claim 6, wherein modeling throughput comprises calculating a total throughput delay incurred by processing the series of tasks for each of the plurality of settings within the range of power management timer settings.

8. The method of claim 7, wherein calculating the total throughput delay incurred by processing the series of tasks comprises:
    determining a first time for the device to handle the series of tasks received when the device is in the first power level;
    calculating a first throughput delay value representing a second time for the device to handle the series of tasks received when the device is in a transition from the first power level to the second power level minus the first time for the device to handle the series of tasks received when the device is in the first power level;
    calculating a second throughput delay value representing a third time for the device to handle the series of tasks received when the device is in the second power level minus the first time for the device to handle the series of tasks received when the device is in the first power level; and
    adding the first throughput delay value and second throughput delay value.

9. The method of claim 7, wherein selecting the power management timer setting from the range of power management timer settings further comprises selecting the power management timer setting based on the total throughput delay incurred by processing the series of tasks.

10. A system comprising:
    a processor; and a memory coupled with and readable by the processor and having stored therein a series of instructions that, when executed by the processor, cause the processor to select a range of power management timer settings for a first power management timer, the first power management timer for switching a device from a first power level to a second power level wherein portions of the device are de-energized, calculate an estimated energy value to complete a series of tasks for each of a plurality of settings within the range of power management timer settings, and select a power management timer setting from the range of power management timer settings based on the estimated energy value to complete the series of tasks for each of the plurality of settings within the range of settings.

11. The system of claim 10, wherein calculating an estimated energy value to complete a series of tasks for each of a plurality of settings within the range of power management timer settings comprises:
  calculating a first energy value representing energy used by the device to handle tasks received when the device is in the first power level;
  calculating a second energy value representing energy used by the device to handle tasks received when the device is in a transition from the first power level to the second power level;
  calculating a third energy value representing energy used by the device to handle tasks received when the device is in the second power level; and
  adding the first energy value, second energy value, and third energy value.

12. The system of claim 10, wherein selecting a range of power management timer settings further comprises selecting a range of power management timer settings for a second power management timer, the second power management timer for switching the device from the second power level to a third power level wherein additional portions of the device are de-energized.

13. The system of claim 12, wherein calculating an estimated energy value to complete a series of tasks for each of a plurality of settings within the range of power management timer settings comprises:
  calculating a first energy value representing energy used by the device to handle tasks received when the device is in the first power level;
  calculating a second energy value representing energy used by the device to handle tasks received when the device is in a transition from the first power level to the second power level;
  calculating a third energy value representing energy used by the device to handle tasks received when the device is in the second power level;
  calculating a fourth energy value representing energy used by the device to handle tasks received when the device is in a transition from the second power level to the third power level;
  calculating a fifth energy value representing energy used by the device to handle tasks received when the device is in the third power level; and
  adding the first energy value, second energy value, third energy value, fourth energy value, and fifth energy value.

14. The system of claim 12, wherein selecting the power management timer setting from the range of power management timer settings comprises selecting a first power management timer setting and selecting a second power management timer setting.

15. The system of claim 10, further comprising modeling throughput for the device based on the range of power management timer settings.

16. The system of claim 15, wherein modeling throughput comprises calculating a total throughput delay incurred by processing the series of tasks for each of the plurality of settings within the range of power management timer settings.

17. The system of claim 16, wherein calculating the total throughput delay incurred by processing a series of tasks comprises:
  determining a first time for the device to handle the series of tasks received when the device is in the first power level;
  calculating a first throughput delay value representing a second time for the device to handle the series of tasks received when the device is in a transition from the first power level to the second power level minus the first time for the device to handle the series of tasks received when the device is in the first power level;
  calculating a second throughput delay value representing a third time for the device to handle the series of tasks received when the device is in the second power level minus the first time for the device to handle the series of tasks received when the device is in the first power level; and
  adding the first throughput delay value and second throughput delay value.

18. The system of claim 16, wherein selecting the power management timer setting from the range of power management timer settings further comprises selecting the power management timer setting based on total throughput delay incurred by processing the series of tasks.

19. A computer readable storage medium having stored thereon a series of instructions representing a routine that, when executed by a processor, causes the processor to:
  select a range of power management timer settings for a first power management timer, the first power management timer for switching a device from a first power level to a second power level wherein portions of the device are de-energized;
  calculate an estimated energy value to complete a series of tasks for each of a plurality of settings within the range of power management timer settings; and select a power management timer setting from the range of power management timer settings based on the estimated energy value to complete the series of tasks for each of the plurality of settings within the range of settings.

20. The computer readable storage medium of claim 19, wherein calculating an estimated energy value to complete a series of tasks for each of a plurality of settings within the range of power management timer settings comprises:
  calculating a first energy value representing energy used by the device to handle tasks received when the device is in the first power level;
  calculating a second energy value representing energy used by the device to handle tasks received when the device is in a transition from the first power level to the second power level;
  calculating a third energy value representing energy used by the device to handle tasks received when the device is in the second power level; and
  adding the first energy value, second energy value, and third energy value.

21. The computer readable storage medium of claim 19, wherein selecting a range of power management timer settings further comprises selecting a range of power management timer settings for a second timer, the second power management timer for switching the device from the second power level to a third power level wherein additional portions of the device are de-energized.

22. The computer readable storage medium of claim 21, wherein calculating an estimated energy value to complete a series of tasks for each of a plurality of settings within the range of power management timer settings comprises:
- calculating a first energy value representing energy used by the device to handle tasks received when the device is in the first power level;
- calculating a second energy value representing energy used by the device to handle tasks received when the device is in a transition from the first power level to the second power level;
- calculating a third energy value representing energy used by the device to handle tasks received when the device is in the second power level;
- calculating a fourth energy value representing energy used by the device to handle tasks received when the device is in a transition from the second power level to the third power level;
- calculating a fifth energy value representing energy used by the device to handle tasks received when the device is in the third power level; and
- adding the first energy value, second energy value, third energy value, fourth energy value, and fifth energy value.

23. The computer readable storage medium of claim 19, wherein selecting the power management timer setting from the range of power management timer settings comprises selecting a first power management timer setting and selecting a second power management timer setting.

24. The computer readable storage medium of claim 19, further comprising modeling throughput for the device based on the range of power management timer settings.

25. The computer readable storage medium of claim 24, wherein modeling throughput comprises calculating a total throughput delay incurred by processing the series of tasks for each of the plurality of settings within the range of power management timer settings.

26. The computer readable storage medium of claim 25, wherein calculating the total throughput delay incurred by processing the series of tasks comprises:
- determining a first time for the device to handle the series of tasks received when the device is in the first power level;
- calculating a first throughput delay value representing a second time for the device to handle the series of tasks received when the device is in a transition from the first power level to the second power level minus the first time for the device to handle the series of tasks received when the device is in the first power level;
- calculating a second throughput delay value representing a third time for the device to handle the series of tasks received when the device is in the second power level minus the first time for the device to handle the series of tasks received when the device is in the first power level; and
- adding the first throughput delay value and second throughput delay value.

27. The computer readable storage medium of claim 25, wherein selecting the power management timer setting from the range of power management timer settings further comprises selecting the power management timer setting based on the total throughput delay incurred by processing the series of tasks.

* * * * *